US011933086B2

(12) United States Patent
Ferri et al.

(10) Patent No.: US 11,933,086 B2
(45) Date of Patent: Mar. 19, 2024

(54) DOUBLE PULL LATCH FOR CLOSURE PANEL SUCH AS HOOD

(71) Applicant: MAGNA CLOSURES INC., Newmarket (CA)

(72) Inventors: James Joseph Ferri, Maple (CA); John Clark, Maple (CA); John Robert Scott Mitchell, Newmarket (CA); Ilya Neyman, Thornhill (CA)

(73) Assignee: MAGNA CLOSURES INC., Newmarket (CA)

(*) Notice: Subject to any disclaimer, the term of this patent is extended or adjusted under 35 U.S.C. 154(b) by 1177 days.

(21) Appl. No.: 16/164,139

(22) Filed: Oct. 18, 2018

(65) Prior Publication Data

US 2019/0048625 A1 Feb. 14, 2019

Related U.S. Application Data

(63) Continuation of application No. 14/467,173, filed on Aug. 25, 2014, now Pat. No. 10,145,154, which is a (Continued)

(51) Int. Cl.
*E05B 83/24* (2014.01)
*E05B 85/26* (2014.01)

(52) U.S. Cl.
CPC .............. *E05B 83/24* (2013.01); *E05B 85/26* (2013.01); *Y10S 292/14* (2013.01); *Y10T 292/1047* (2015.04); *Y10T 292/108* (2015.04)

(58) Field of Classification Search
CPC ...... E05B 83/24; E05B 85/26; Y10T 292/108; Y10T 292/1047; Y10T 292/1078;
(Continued)

(56) References Cited

U.S. PATENT DOCUMENTS 1,747,092 A 2/1930 Van Note
2,924,473 A 2/1960 Krause
(Continued)

FOREIGN PATENT DOCUMENTS

CZ 293067 A3 1/1998
DE 102007008700 A1 * 8/2008 ............ E05B 83/16
(Continued)

OTHER PUBLICATIONS

International Search Report & Written Opinion dated May 16, 2013 in relation to PCT International Patent Application Mo. PCT/CA2013/000194.

*Primary Examiner* — Kristina R Fulton
*Assistant Examiner* — Noah Horowitz

(57) ABSTRACT

In an aspect, a latch for a closure panel for a vehicle is provided, and includes a ratchet, pawl, release lever, and extension member. The ratchet is movable between a primary closed position, secondary closed position and open position. The pawl is movable between a primary locking position, secondary locking position and unlocking position. The release lever is movable between home and actuated positions. When the pawl is in the primary locking position the release lever has a selected amount of reach for driving the pawl to the secondary locking position during movement of the release lever to the actuated position. When the pawl is in the secondary locking position the extension member is movable to extend the reach of the release lever to drive the pawl from the secondary locking position to the unlocked position during movement of the release lever from the home position to the actuated position.

22 Claims, 11 Drawing Sheets

Related U.S. Application Data continuation of application No. PCT/CA2013/000194, filed on Mar. 1, 2013.

(60) Provisional application No. 61/605,310, filed on Mar. 1, 2012.

(58) Field of Classification Search
CPC ........... Y10T 292/081; Y10T 292/0911; Y10S 292/14; Y10S 292/42
See application file for complete search history.

(56) References Cited

U.S. PATENT DOCUMENTS

| | | | | |
|---|---|---|---|---|
| 4,203,621 | A * | 5/1980 | Noel | E05B 85/26 292/216 |
| 4,875,724 | A | 10/1989 | Gruber | |
| 6,848,727 | B1 * | 2/2005 | Cetnar | E05B 81/20 292/216 |
| 9,187,936 | B2 | 11/2015 | Kim et al. | |
| 9,255,429 | B2 | 2/2016 | Kim et al. | |
| 9,765,554 | B2 * | 9/2017 | Cumbo | E05B 81/70 |
| 10,145,154 | B2 * | 12/2018 | Ferri | E05B 83/24 |
| 2006/0170224 | A1 | 8/2006 | Mitchell et al. | |
| 2006/0226661 | A1 * | 10/2006 | Moore | E05B 81/20 292/216 |
| 2012/0161456 | A1 | 6/2012 | Riedmayr | |
| 2014/0319848 | A1 | 10/2014 | Fannon | |
| 2015/0145263 | A1 | 5/2015 | Farris | |
| 2015/0345186 | A1 | 12/2015 | Park | |
| 2016/0076279 | A1 | 3/2016 | Ilea | |

FOREIGN PATENT DOCUMENTS

| | | | |
|---|---|---|---|
| DE | 102007008700 | A1 | 8/2008 |
| DE | 102009034904 | A1 | 2/2011 |
| DE | 102009037037 | A1 | 2/2011 |
| DE | 102010062700 | A1 | 6/2012 |
| DE | 102011003808 | A1 | 8/2012 |
| EP | 285412 | A2 | 10/1988 |
| GB | 907930 | A | 10/1962 |
| JP | 2007016398 | A | 1/2007 |
| WO | 0079079 | | 12/2000 |

* cited by examiner

DOUBLE PULL LATCH FOR CLOSURE PANEL SUCH AS HOOD

CROSS-REFERENCE TO RELATED APPLICATIONS

This application is a continuation application of U.S. patent application Ser. No. 14/467,173, filed on Aug. 25, 2014, which is a continuation application of PCT International Application No. PCT/CA2013/000194, filed on Mar. 1, 2013, which claims the benefit of U.S. Provisional Application No. 61/605,310, filed on Mar. 1, 2012, the contents of which are incorporated herein in their entirety.

FIELD

The present disclosure relates to latches for closure panels and more particularly to vehicle hood latches.

BACKGROUND

Latches for vehicle hoods and the like are typically actuated in two stages. During a first stage a handle is actuated inside the vehicle which moves the latch from a primary closed position to secondary closed position. To release the latch completely the vehicle occupant typically must exit the vehicle and actuate a lever that is underhood. This may be inconvenient in some situations.

SUMMARY

In an aspect, a latch for a closure panel for a vehicle is provided, and includes a ratchet, a pawl, a release lever, and an extension member. The ratchet is movable between a primary closed position, a secondary closed position and an open position, and is biased towards the open position. The pawl is movable between a primary locking position, a secondary locking position and an unlocking position, and is biased towards the primary locking position. The release lever is movable between a home position and an actuated position, and is biased towards the home position. When the pawl is in the primary locking position the release lever has a selected amount of reach for driving the pawl from the primary locking position to the secondary locking position during movement of the release lever from the home position to the actuated position. When the pawl is in the secondary locking position the extension member is movable to a position to extend the reach of the release lever to drive the pawl from the secondary locking position to the unlocked position during movement of the release lever from the home position to the actuated position.

In another aspect, a latch for a closure panel for a vehicle is provided, and includes a ratchet, a pawl, a release lever, and a double pull lever. The ratchet is movable between a primary closed position, a secondary closed position and an open position, and is biased towards the open position. The pawl is movable between a primary locking position, a secondary locking position and an unlocking position, and is biased towards the primary locking position. The release lever is movable between a home position and an actuated position, and is biased towards the home position. The double pull lever is movable between an inoperative position and an operative position. When the double pull lever is in the inoperative position movement of the release lever to the actuated position drives the pawl to the secondary locking position. When the double pull lever is in the operative position movement of the release lever to the actuated position drives the pawl to the unlocking position. When the pawl is driven from the primary locking position to the secondary locking position by the release lever the double pull lever is prevented from moving to the operative position. When the pawl is in the secondary locking position movement of the release lever towards the actuated position brings the double pull lever to the operative position.

In yet another aspect, a latch for a closure panel for a vehicle is provided, and includes a ratchet, a pawl, a release lever and a pawl lockout member. The ratchet is movable between a primary closed position, a secondary closed position and an open position, and is biased towards the open position. The pawl is movable between a primary locking position, a secondary locking position and an unlocking position, and is biased towards the primary locking position. The release lever is movable between a home position and an actuated position, and is biased towards the home position. A first movement of the release lever to the actuated position drives the pawl to the secondary locking position. A second movement of the release lever to the actuated position drives the pawl to the unlocking position. The pawl lockout member is movable between a lockout position and a non-lockout position. In the lockout position the pawl lockout member holds the pawl in the unlocked position. In the non-lockout position the pawl lockout member permits movement of the pawl to the primary locking position.

In an example embodiment, with the pawl lockout lever in the non-lockout position, the pawl can move from the primary locking position to the secondary locking position by actuating the release lever, and can be returned to the primary locking position. When the pawl is in the secondary locking position actuation of the release lever moves the pawl towards the unlocking position and causes the pawl lockout lever to lockout the pawl, preventing the pawl from leaving the unlocking position. When the ratchet reaches the open position the pawl lockout lever releases the pawl permitting the pawl to engage and hold the ratchet in the secondary or primary closed positions.

In yet another aspect, a latch for a closure panel for a vehicle. The latch includes a housing, and a ratchet pivotably connected to the housing for movement between a primary closed position in which the ratchet holds a striker at a first depth in a fishmouth of the housing, a secondary closed position in which the ratchet holds the striker at a second depth in a fishmouth of the housing and an open position in which the ratchet is positioned to permit release of the striker from the latch. The ratchet is biased towards the open position. The latch further includes a pawl pivotably connected to the housing for movement between a primary locking position in which the pawl holds the ratchet in the primary closed position, a secondary locking position in which the pawl holds the ratchet in the secondary closed position and an unlocking position in which the pawl permits the ratchet to move to the open position. The pawl is biased towards the primary locking position. The latch further includes a release lever pivotably connected to the housing for movement about a release lever axis between a home position and an actuated position. The release lever is biased towards the home position. The latch further includes an extension member that is pivotably connected to the release lever for movement between an inoperative position and an operative position. When the pawl is in the primary locking position the extension member is prevented from leaving the inoperative position thereby providing the release lever with a selected amount of reach for driving the pawl from the primary locking position to the secondary locking position during movement of the release lever from the home position to the actuated position. When the pawl is in the secondary locking position the extension member is movable under the bias of an extension member biasing member to the operative position in which the extension member is positioned between the release lever and the pawl to extend the reach of the release lever so as to drive the pawl from the secondary locking position to the unlocked position during movement of the release lever from the home position to the actuated position.

BRIEF DESCRIPTION OF THE DRAWINGS

The foregoing and other aspects will now be described by way of example only with reference to the attached drawings, in which.

DETAILED DESCRIPTION

Figure 1:
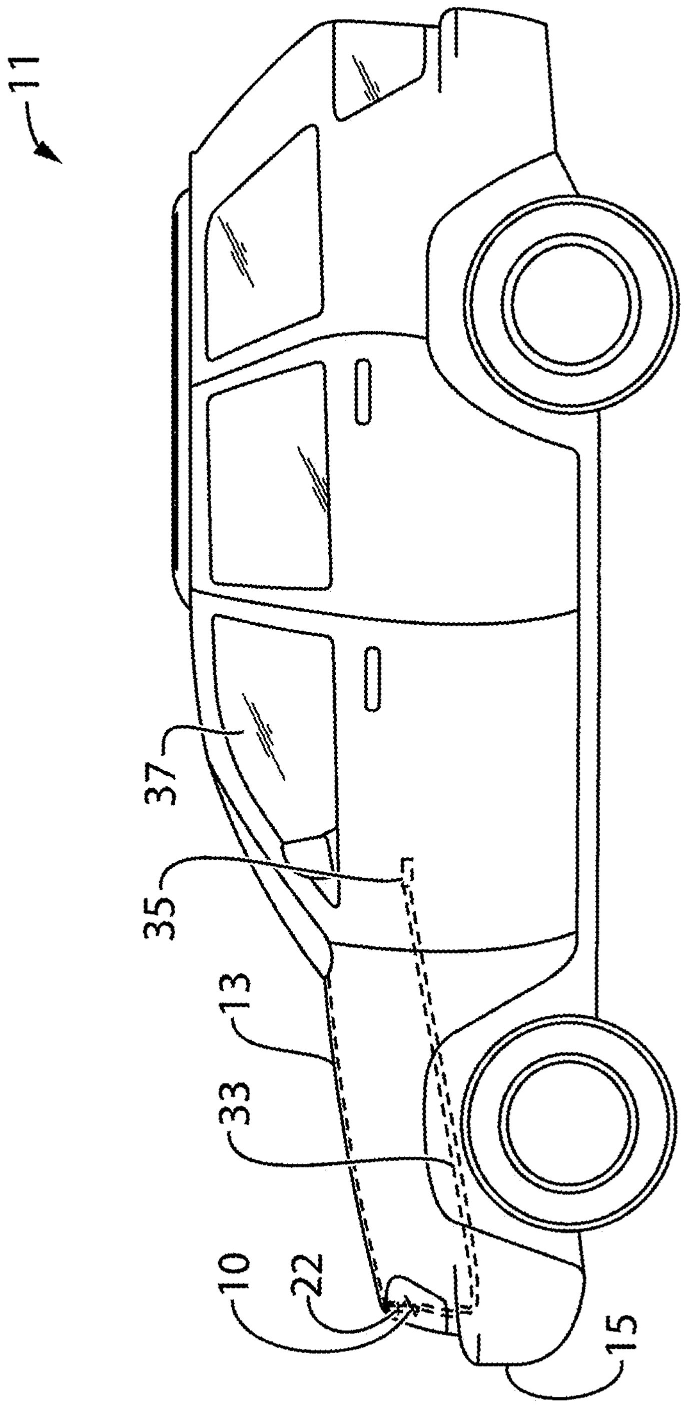
FIG. 1 is a side view of a vehicle.
Figure 2:
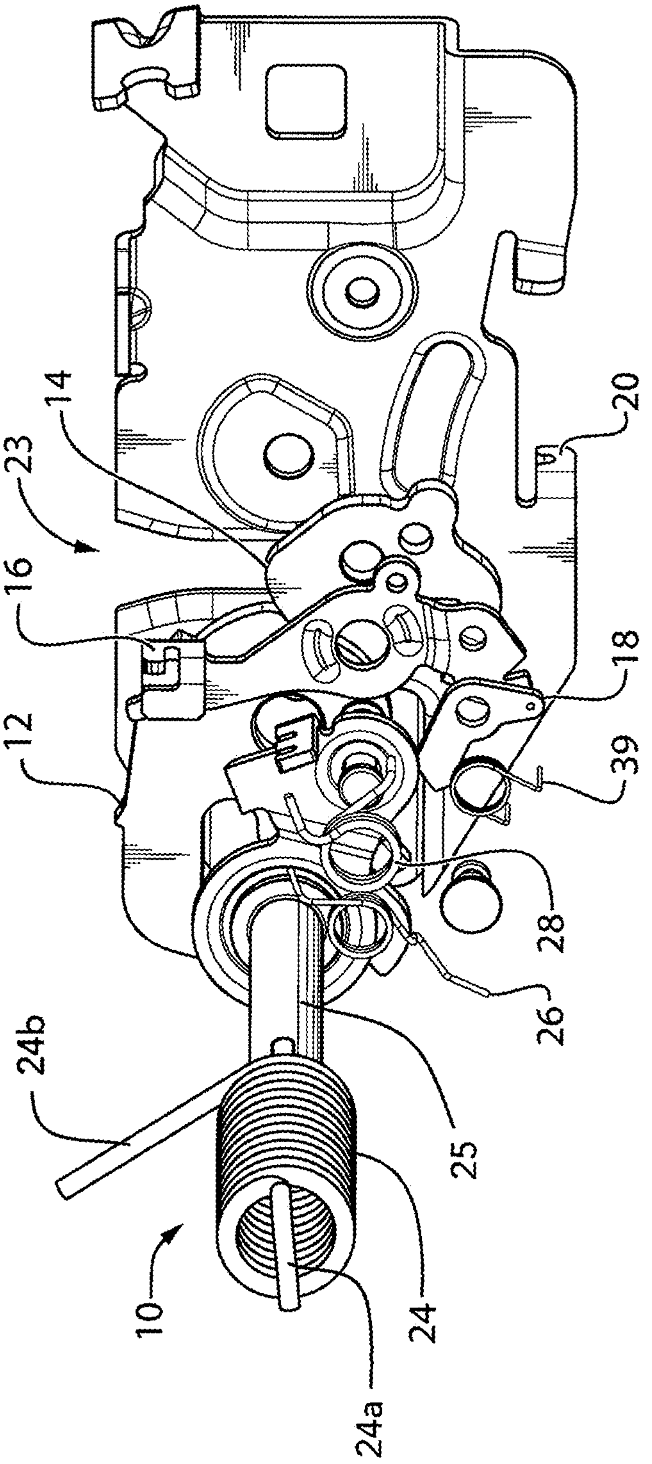
FIG. 2 is a perspective view of a latch in the vehicle shown in FIG. 1.
Figure 3:
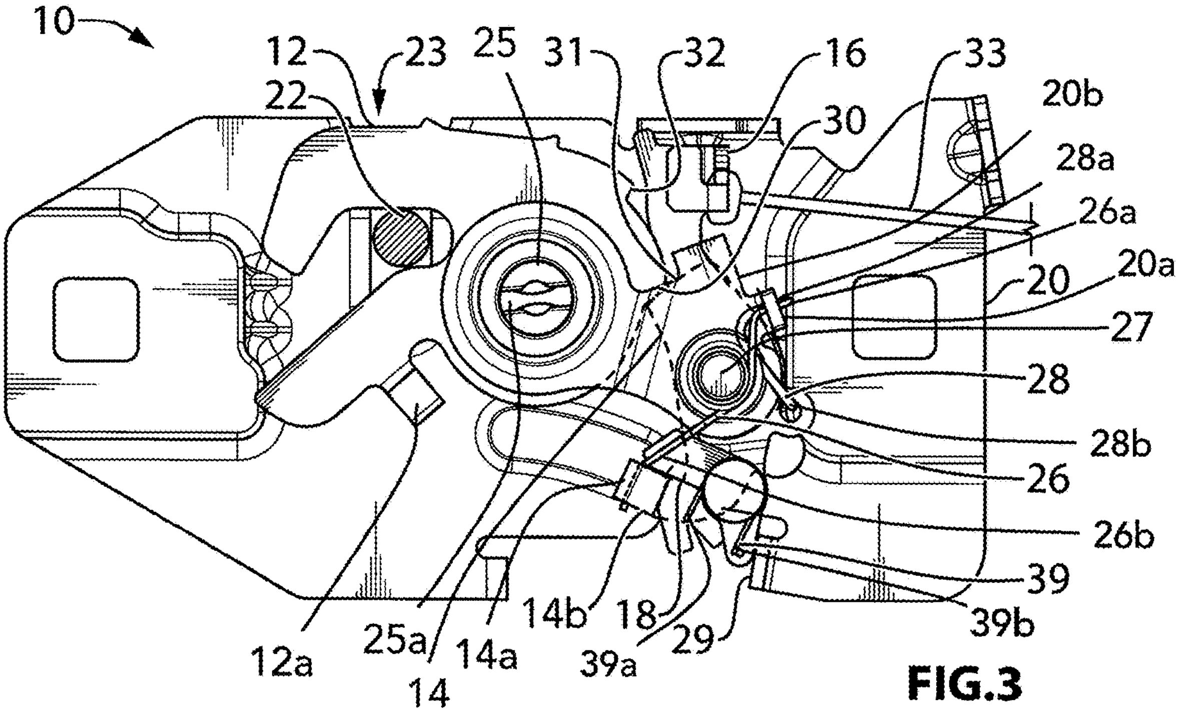
FIG. 3 is a plan view of the latch shown in FIG. 2, in a primary closed position.

Reference is made to FIG. 1, which shows a vehicle 11 that has a hood 13, on which there is a striker 22. The striker 22 is capturable by a latch 10 that is mounted on the body (shown at 15) of the vehicle 10. Referring to FIG. 2, the latch 10 includes a ratchet 12, a pawl 14, a release lever 16, a double pull lever 18, and a housing 20 (part of which is omitted for clarity). The view shown in FIG. 2 is an exploded view, and accordingly, the elements of the latch are not shown in their installed positions in FIG. 2. As shown in FIG. 3, the ratchet 12 is pivotably connected to the housing 20 and is movable between a primary closed position shown in FIG. 3, a secondary closed position shown in FIG. 6, and an open position shown in FIG. 9. The pivotal movement of the ratchet 12 may take place about a pin 25 (FIG. 3) that is mounted to the housing 20. In the primary and secondary closed positions, the ratchet 12 prevents the withdrawal of a striker 22 that is mounted on the vehicle hood 13 or other closure panel from the latch 10. When in the primary closed position, the ratchet 12 holds the striker 22 relatively deeper into the fishmouth (shown at 23) of the housing 20 than in the secondary closed position. Thus, in the primary closed position the ratchet 12 holds the striker 22 at a first depth in a fishmouth 23 of the housing 20, and in the secondary closed position the ratchet 12 holds the striker 22 at a second depth in a fishmouth 23 of the housing 20.

The ratchet 12 is biased towards the open position by a ratchet biasing member 24 (FIG. 2). The ratchet biasing member 24 may be, for example, a torsion spring. The torsion spring may extend around the pin 25 and may have a first end **24*a* (FIG. 2) anchored in a slot 25*a* (FIG. 3) in the pin 25 and a second end 24*b* that acts against an engagement member 12*a* on the ratchet 12**.

Figure 9:
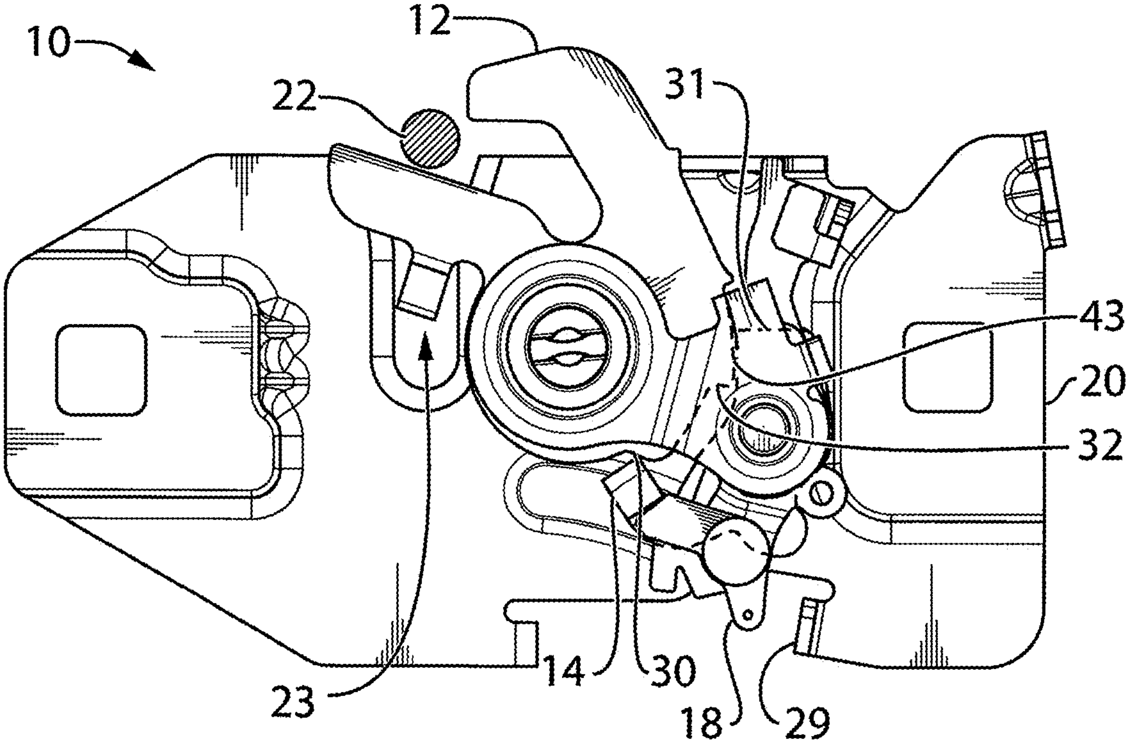
FIG. 9 is a plan view of the latch shown in FIG. 2, showing movement of the ratchet to an open position.

The pawl 14 is pivotably connected to the housing 20 and is movable between a primary locking position (FIG. 3), a secondary locking position (FIG. 6) and an unlocking position (FIG. 9). The pivotal movement of the pawl 14 may be about a pin 27 (FIG. 3), which defines an axis A (shown in FIG. 4), which may be referred to as a pawl axis. In the primary locking position (FIG. 3) a pawl locking surface 31 on the pawl 14 engages a primary locking surface 30 on the ratchet 12 and holds the ratchet 12 in the primary closed position. In the secondary locking position (FIG. 6), the pawl locking surface 31 engages a secondary locking surface 32 on the ratchet 12 to hold the ratchet 12 in the secondary closed position. In the unlocking position (FIG. 9) the pawl 14 permits the ratchet 12 to move to the open position. The pawl 14 is biased towards the primary locking position by a pawl biasing member 26 (FIG. 2). The pawl biasing member 26 may be, for example, a torsion spring. The torsion spring may extend around the pin 27 and have a first end **26*a* anchored through an aperture in an ear 20*a* on a plate 20*b* that is part of the housing 20, and a second end 26*b* that engages an engagement tab 14*a*. The engagement tab 14*a* extends inwardly from a release arm 14*b* that extends outwardly from the general plane of the pawl 14 so as to be engageable by the release lever 16 and the double pull lever 18**, as explained in further detail below.

Figure 4:
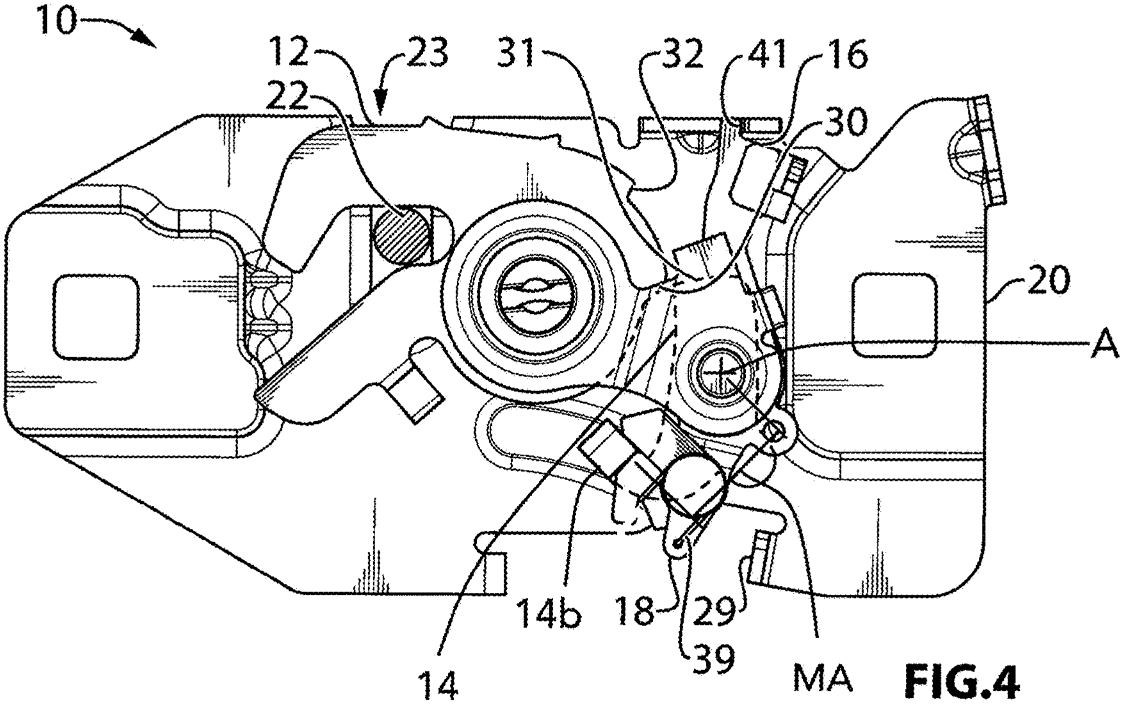
FIG. 4 is a plan view of the latch shown in FIG. 2, showing actuation of a release lever.

The release lever 16 is pivotably connected to the housing 20 and is movable between a home position shown in FIG. 3, and an actuated position shown in FIG. 4. The pivotal movement of the release lever 16 may be about the same pin 27 (FIG. 3) and axis A (FIG. 4) about which the pawl 14 pivots. Thus the axis A may be referred to as a release lever axis A. Actuation of the release lever 16 (i.e. movement of the release lever 16 from the home position to the actuated position) drives movement of the pawl 14 from the primary locking position to the secondary locking position or from the secondary locking position to the unlocked position, as described further below. The release lever 16 is biased towards the home position by a release lever biasing member shown at 28. The release lever biasing member 28 may be, for example a torsion spring. The torsion spring may extend around the pin 27 and have a first end **28*a* anchored through an aperture in the ear 20*a* on the plate 20*b* from the housing 20, and a second end 28***b* that extends through an aperture in the release lever 16. A cable 33 (FIGS. 1 and 3) may connect the release lever 16 to an actuation handle 35 (FIG. 1) or the like in the passenger compartment (shown at 37) of the vehicle. Actuation of the handle 35 brings the release lever 16 to the actuated position.

Figure 7:
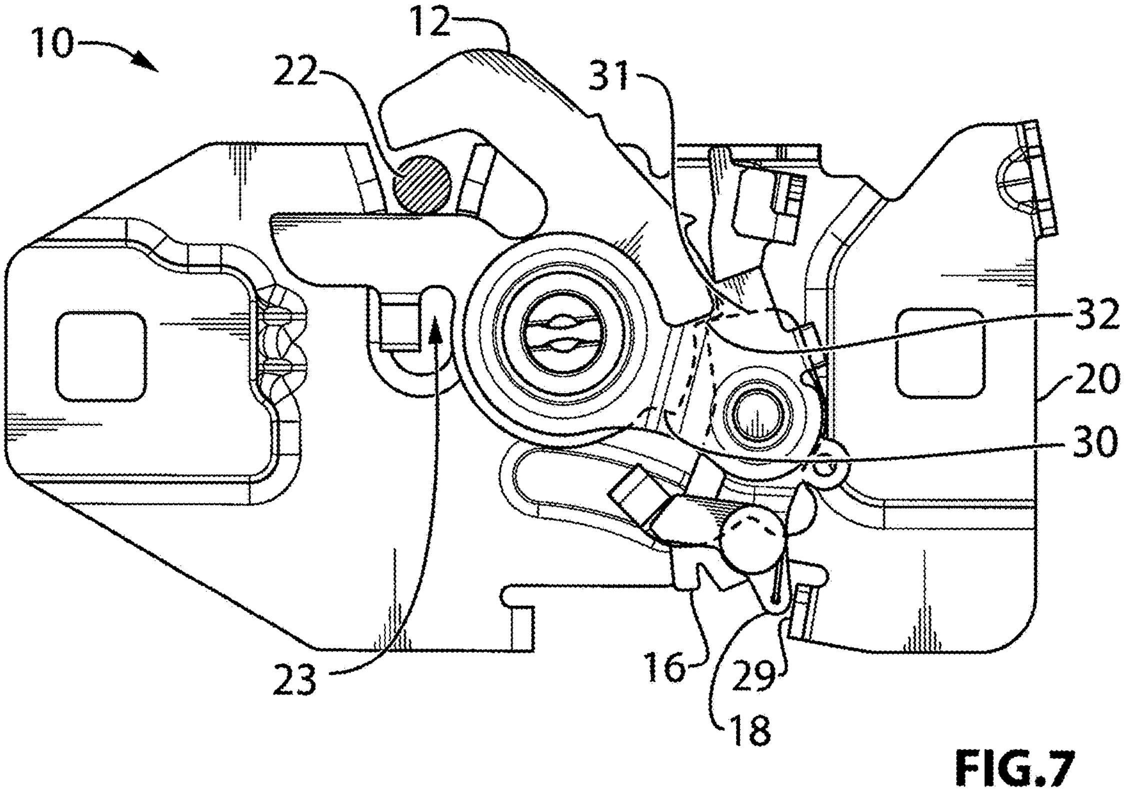
FIG. 7 is a plan view of the latch shown in FIG. 2, showing an initial amount of travel of the release lever during a second actuation of the release lever.

The double pull lever 18 is pivotably connected to the release lever 16 and is movable between an inoperative position shown in FIG. 3, and an operative position shown in FIG. 7. In the inoperative position, the double pull lever 18 does not drive movement of the pawl 14 when the release lever 16 is actuated. In the operative position, the double pull lever 18 does drive movement of the pawl 14 when the release lever 16 is actuated, as described further below. The double pull lever 18 is biased towards the operative position by a double pull lever biasing member 39 (FIGS. 2 and 3). The double pull lever biasing member 39 may be, for example, a torsion spring. The torsion spring may extend around the pin 27 and have a first end 39*a* anchored in a notch 16*a* in the release lever 16, and a second end 39*b* that extends through an aperture in the double pull lever 18.

When the latch 10 is positioned in a primary closed position, as shown in FIG. 3), the double pull lever 18 is prevented from leaving the inoperative position by two features. One feature is a double pull lever engagement surface 29 on the housing 20 which engages the double pull lever 18 and holds the double pull lever 18 in the inoperative position when the release lever 16 is in the home position. It will be noted that the double pull engagement surface 29 may also serve to act as a stop surface for defining the home position for the release lever 16. Alternatively another surface elsewhere on the housing 20 may be used to limit the travel of the release lever 16 under the urging of the release lever biasing member 28. The second feature that prevents the double pull lever 18 from leaving the inoperative position is the release arm 14*b* on the pawl 14 itself. When the pawl 14 is in the primary locking position the release arm 14*b* on the pawl 14 prevents the double pull lever 18 from rotating into position to get between the pawl 14 and the release lever 16 so as to be able to transfer a force from the release lever 16 to the pawl 14.

The operation of the latch 10 is as follows. The latch 10 is shown in the primary closed position in FIG. 3. In this position, the pawl 14 engages the primary locking surface 30 on the ratchet 12 and holds the ratchet 12 in the primary closed position. A vehicle occupant inside the passenger compartment 37 (FIG. 1) pulls the handle 35, which drives the release lever 16 clockwise (in the view shown in FIG. 3) to the actuated position shown in FIG. 4. In the position shown in FIG. 3, the double pull lever 18 is in the inoperative position. However, because the pawl 14 is in the primary locking position, the pawl 14 can be reached by and engaged by the release lever 16 directly when the release lever 16 is actuated. Actuation of the release lever 16 drives the pawl 14 to the secondary locking position shown in FIG. 5. This permits the ratchet 12 to move from the primary closed position to the secondary closed position as shown in FIG. 6 under the bias of the ratchet biasing member 24.

Figure 5:
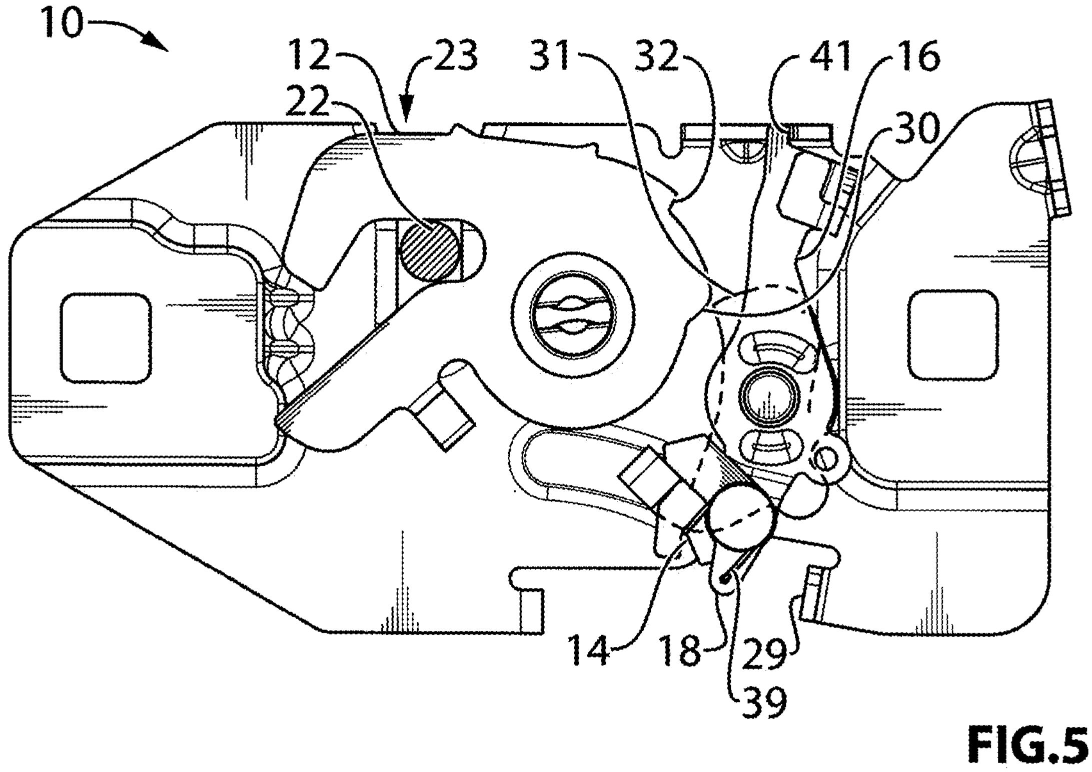
FIG. 5 is a plan view of the latch shown in FIG. 2, showing movement of a ratchet to a secondary closed position.

As can be seen in FIGS. 4 and 5, the actuated position for the release lever 16 is set by the release lever limit surface 41 on the housing 20. In other words, the release lever limit surface 41 determines the actuated position for the release lever 16 and prevents movement of the release lever 16 therepast. As a result, the release lever 16 cannot directly drive the pawl 14 past the secondary locking position on the first actuation of the handle 35.

Figure 6:
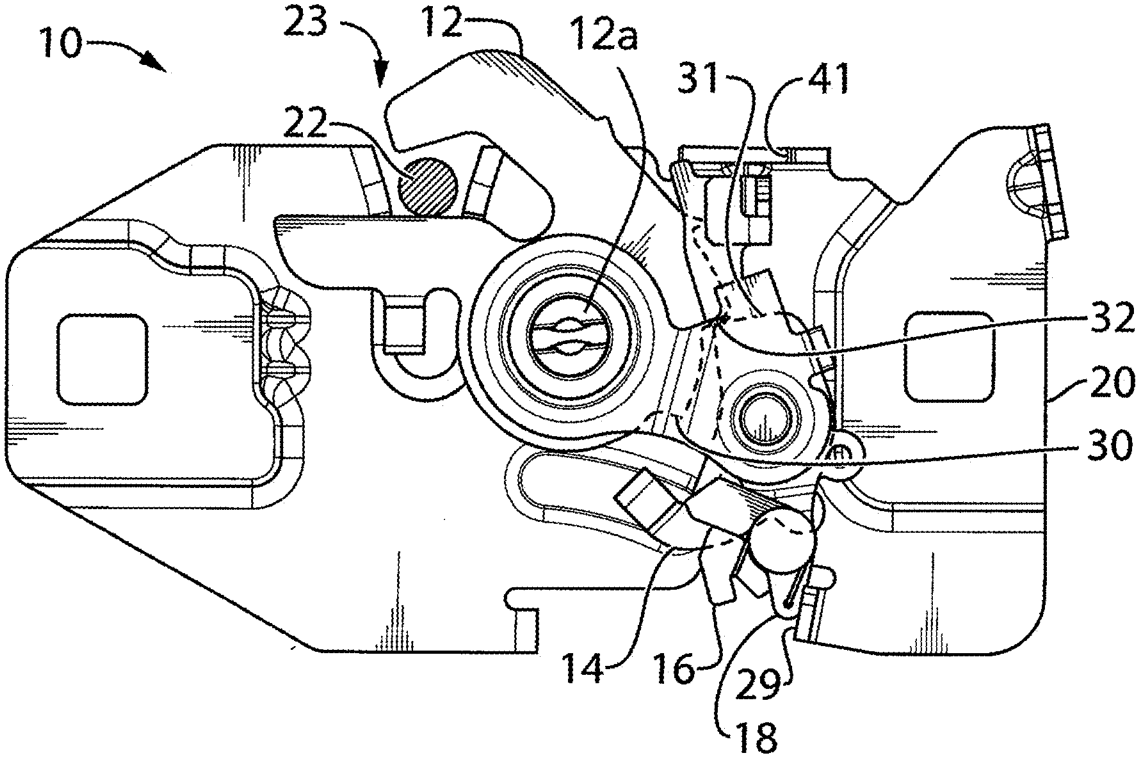
FIG. 6 is a plan view of the latch shown in FIG. 2, showing release of the release lever with the ratchet in the secondary closed position.

After actuating the release lever 16, the vehicle occupant may release the handle 35 permitting the release lever 16 to return to the home position as shown in FIG. 6. The position shown in FIG. 6 is the secondary closed position for the latch 10. In this position, the ratchet 12 is held in the secondary locking position by engagement of the pawl 14 with the secondary locking surface 32 on the ratchet 12. During the movement of the pawl 14 from the primary locking position to the secondary locking position, (e.g. from actuation of the release lever 16), the double pull lever 18 is prevented from moving to the operative position because such movement is obstructed by the release arm 14*b* on the pawl 14 itself, as described above. It is alternatively possible for such movement of the double pull lever 18 to the operative position to be obstructed by other means, however.

When the release lever 16 is in the home position, the double pull lever 18 is prevented from leaving the inoperative position by the double pull lever engagement surface 29, regardless of the position of the pawl 14. More specifically, as the release lever 16 rotates (counterclockwise in the view shown) to the home position, the release lever 16 brings the double pull lever 18 into engagement with the surface 29. The force with which the release lever 16 is driven counterclockwise by the release lever biasing member 28 overcomes any resistive force from the double pull lever biasing member 39 thereby resulting in a rotation of the double pull lever 18 clockwise to the inoperative position against the bias of the biasing member 39.

Figure 8:
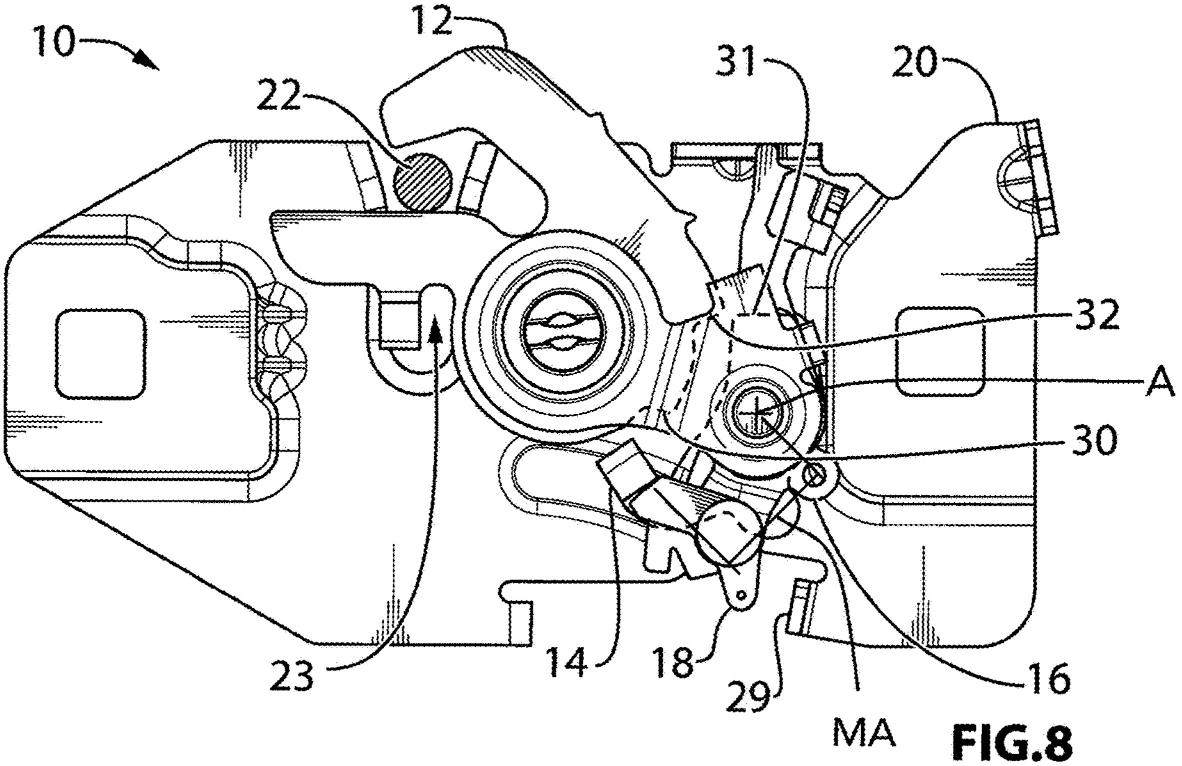
FIG. 8 is a plan view of the latch shown in FIG. 2, showing completion of the second actuation of the release lever.

To bring the latch to the fully open position so as to fully release the striker 22 from the latch 10, the vehicle occupant may actuate the release lever 16 again using the handle 35. It will be noted that the pawl 14, which is in the secondary locking position in FIG. 6, no longer obstructs movement of the double pull lever 18 to the operative position. Accordingly, once the double pull lever 18 disengages from the double pull lever engagement surface 29 (as shown in FIG. 7) during movement of the release lever 16 from the home position shown in FIG. 6 to the actuated position shown from FIG. 8, the double pull lever 18 moves (counterclockwise in the view shown in FIGS. 6 and 7) to the operative position under the bias of the biasing member 39. In the operative position, the double pull lever 18 extends the effective reach of the release lever 16 so that movement of the release lever 16 to the actuated position (FIG. 8) drives the pawl 14 (via the double pull lever 18) to move from the secondary locking position (FIGS. 6 and 7) to the unlocked position (FIG. 8). Movement of the pawl 14 to the unlocked position permits movement of the ratchet 12 to the open position shown in FIG. 9 under the bias of the ratchet biasing member 24 (FIG. 2), thereby permitting the striker 22 to leave the ratchet 12 and the hood 13 (FIG. 1) to open.

Figure 10:
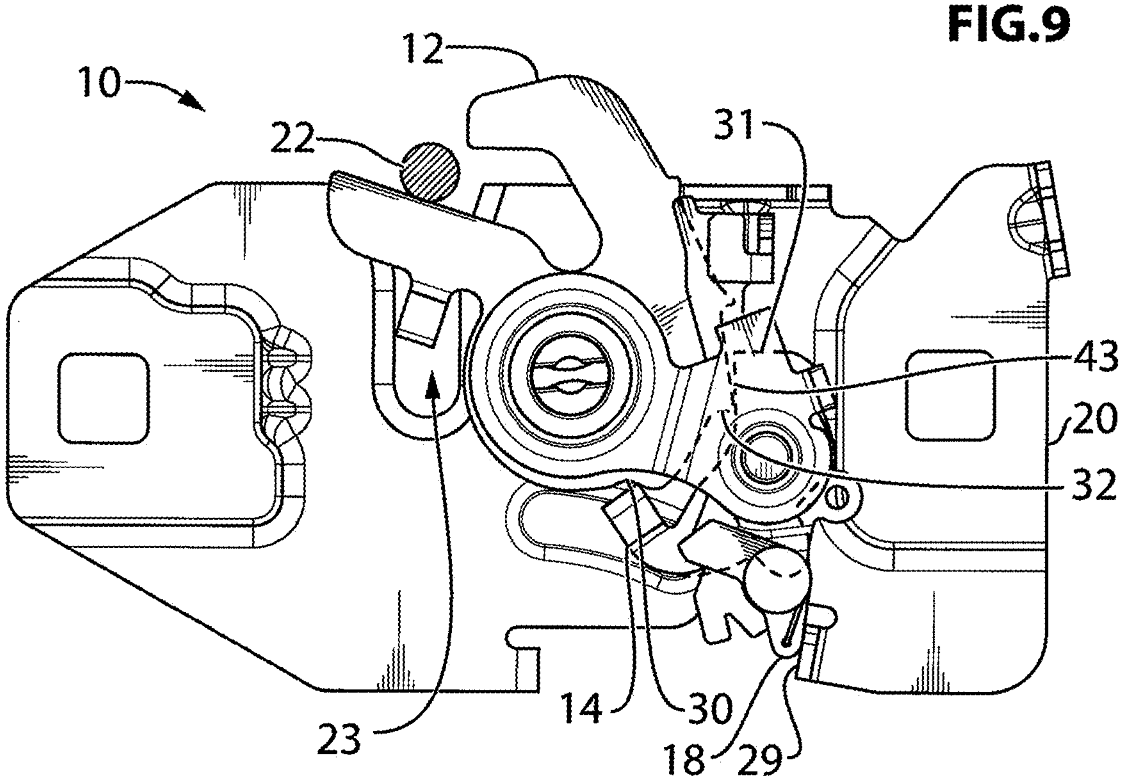
FIG. 10 is a plan view of the latch shown in FIG. 2, showing release of the release lever with the ratchet to an open position.

Upon release of the handle 35, the release lever 16 is permitted to return to the home position as shown in FIG. 10. FIG. 10 corresponds to the open position for the latch. As can be seen in FIG. 10, the movement of the release lever 16 back to the home position brings the double pull lever 18 back into engagement with the engagement surface 29, which brings the double pull lever 18 into the inoperative position and out of the path of the pawl 14.

Additionally, the pawl 14 is permitted to be biased by the pawl biasing member 26 (FIG. 3) into engagement with a slide surface 43 (FIG. 10) on the ratchet 12.

In the position shown in FIG. 10, the latch 10 is ready to close again upon entry of the striker 22 into the fishmouth 23. When such entry occurs (e.g. when a vehicle occupant or driver closes the hood 13 (FIG. 1), the striker 22 drives the ratchet 12 back to the secondary closed position shown in FIG. 6 and ultimately to the primary closed position shown in FIG. 3. During such movement of the ratchet 12, the pawl 14 can move under the bias of the pawl biasing member 26 (FIG. 2) from the unlocked position shown in FIG. 10 to the secondary locking position shown in FIG. 6 and finally to the primary locking position shown in FIG. 3. Because the double pull lever 18 is held in the inoperative position by the engagement surface 29, the double pull lever 18 permits the return of the pawl 14 to the primary locking position shown in FIG. 3.

It will be noted that, when the latch 10 is in the secondary closed position shown in FIG. 6, the vehicle occupant can decide that they do not want to fully open the hood 13 and can press down on the hood 13 to fully close it. In such an event, the movement of the pawl 14 from the secondary locking position to the primary locking position is permitted by the double pull lever 18 because the double pull lever 18 is kept in the inoperative position by the engagement surface 29.

It has been disclosed for the pawl 14 to prevent the double pull lever 18 from moving to the operative position during movement of the pawl 14 from the primary locking position to the secondary locking position (and during movement of the ratchet 12 from the primary closed position to the secondary closed position). It is alternatively possible for the ratchet 12 itself to prevent the double pull lever 18 from moving to the operative position during movement of the pawl 14 during movement of the ratchet 12 from the primary closed position to the secondary closed position. For example, the ratchet 12 could be provided with an arm that is engageable with double pull lever 18 to obstruct the movement of the double pull lever 18 to the operative position. The arm would engage and obstruct the double pull lever 18 during travel of the ratchet 12 to the secondary closed position, at which point the arm would leave the double pull lever 18 to permit the double pull lever 18 to drop in behind the release arm 14*b* on the pawl 14 under the urging of the biasing member 39.

Use of the latch 10 eliminates the need for the occupant to pull a lever or handle inside the vehicle and then exit the vehicle to go to the hood or other closure panel, and release the hood or other closure panel by manually finding and actuating a second lever with their hands, which can dirty the occupant's hands and which can be otherwise inconvenient.

Furthermore, this latch 10 inhibits a situation where an occupant inadvertently completely opens the hood 13 after actuating the handle 35 only a single time.

While element 18 has been described as a double pull lever, the element 18 may also be referred to as an extension member and may be described in one aspect as working as follows. When the pawl 14 is in the primary locking position (FIG. 3) the release lever 16 has a selected amount of reach for driving the pawl 14 from the primary locking position (FIG. 3) to the secondary locking position (FIG. 6) during movement of the release lever 16 from the home position to the actuated position. When the pawl 14 is in the secondary locking position (FIG. 6) the extension member 18 is movable to a position to extend the reach of the release lever 16 to drive the pawl 14 from the secondary locking position (FIG. 6) to the unlocked position (FIG. 9) during movement of the release lever 16 from the home position to the actuated position. In referring to element 18 as an extension member, the biasing member 39 may be referred to as an extension member biasing member.

It will be noted that the release lever 16 travels the same angular distance when releasing the pawl 14 from the primary locking position to the secondary locking position, and is travelled when releasing the pawl 14 from the secondary locking position to the unlocked position. It will be further noted that the moment arm (shown at MA in FIG. 4) about the release lever axis A is approximately the same when the release lever 16 is directly engaged with the release arm 14*b* on the pawl 14 to move the pawl 14 from the primary locking position to the secondary locking position as when the release lever 16 is engaged with the release arm 14*b* through the double pull lever 18 to move the pawl 14 from the secondary locking position to the unlocked position. Each of these two features contributes to providing the vehicle occupant with a similar feel to the latch 10 when pulling the handle 35 the first time (to move the latch 10 to the secondary closed position) as when pulling the handle 35 the second time (to move the latch 10 to the open position). By providing a consistent feel to the latch 10 the user experience of the vehicle occupant is improved relative to a latch where the feel of the latch 10 is very different between the first and second pulls of the handle.

Figure 11:
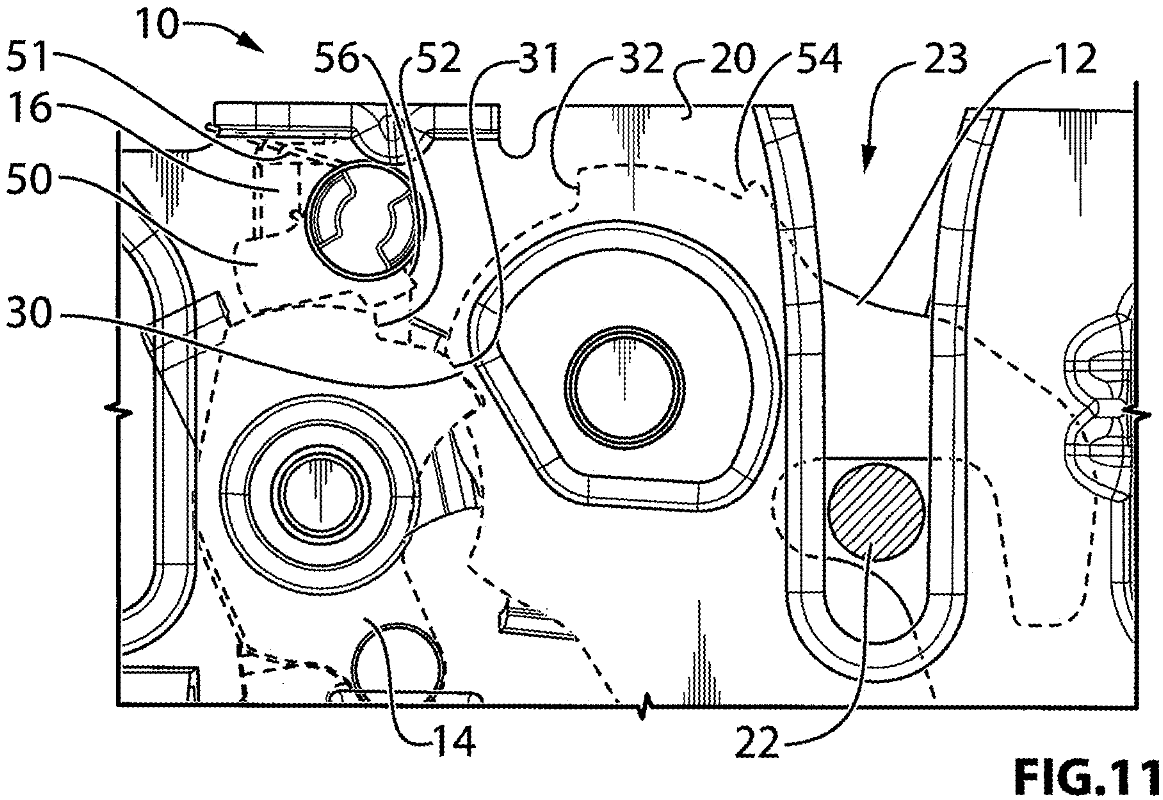
FIG. 11 is a plan view of the latch shown in FIG. 2 and including an optional pawl lockout member, in a primary closed position.

Reference is made to FIG. 11, which shows the latch 10 with an optional pawl lockout lever 50 that is movable between a non-lockout position (FIG. 11) in which the lockout lever 50 does not interfere with the movement of the pawl 14, and a lockout position (FIG. 14) in which the lockout lever 50 interferes with the movement of the pawl 14. The latch 10 further includes a lockout lever biasing member 51 that is positioned to bias the lockout lever 50 towards the lockout position. Some of the components of the latch 10 shown in FIGS. 11-16 may have a different appearance than their counterpart components in FIGS. 2-10, however, the same functions are being performed by those parts and the difference in appearance is not relevant except as noted hereinbelow.

In a situation where there is weight bearing down on the hood 13 (FIG. 1), for example, from a snow load on the hood 13, the force of the ratchet biasing member 24 (FIG. 2) on the ratchet 12 and the force of the hood springs on the hood 13 (and therefore on the striker 22) may be sufficient to drive the ratchet 12 to the secondary closed position, but may be insufficiently strong to drive the ratchet 12 from the secondary closed position to the open position. One reason for this may be that the forces exerted on the ratchet 12 are lower when in the secondary closed position. For example, the spring force from the ratchet biasing member 24 is progressively lower as the biasing member 24 rotates towards its rest position (also referred to as its neutral position). Thus, when the ratchet 12 is in the secondary closed position and the handle 35 is pulled a second time so as to move the pawl 14 to the unlocked position, the ratchet 12 may not move appreciably due to the snow load on the hood 13 (FIG. 1). Thus the ratchet 12 may remain in the secondary closed position. In the event that the ratchet 12 does remain in the secondary closed position, the pawl lockout lever 50 is configured to prevent the pawl 14 from re-engaging with the secondary locking surface 32 on the ratchet 12 when the vehicle occupant lets go of the handle 35 inside the vehicle 11. As a result, even if the hood 13 did not lift up upon actuation of the handle 35, the occupant could get out of the vehicle 11 and manually lift the hood 13. Without a means for preventing the pawl 14 from re-engaging the second locking surface 32 when the occupant releases the handle 35, the pawl 14 may return to the secondary locking position and engage the secondary locking surface 32 on the ratchet 12 if the ratchet 12 has not left the secondary locking position.

Figure 12:
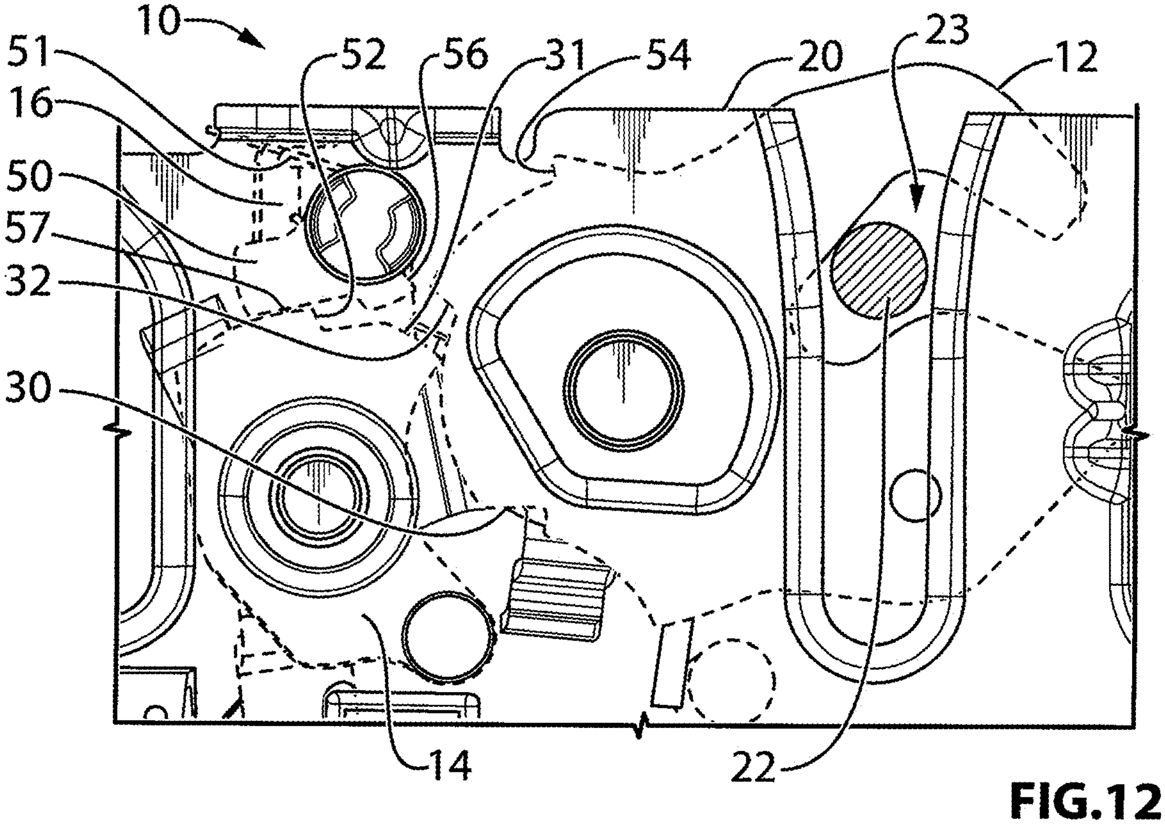
FIG. 12 is a plan view of the latch shown in FIG. 11, showing a pawl in a secondary locking position and movement of the ratchet towards the secondary closed position.

When the latch 10 is in the primary closed position, as shown in FIG. 11, the pawl locking surface 31 engages the primary locking surface 30 on the ratchet 12, preventing opening of the latch 12. As can be seen, the pawl lockout lever 50 is in the non-lockout position and does not engage a lockout surface 52 on the pawl 14 and thus permits movement of the pawl 14 from and to the primary locking position. When the handle 35 (FIG. 1) in the vehicle 11 is pulled, the pawl 14 is moved from the primary locking position to the secondary locking position shown in FIG. 12. The ratchet 12 rotates (counterclockwise in the view shown in FIG. 12) until the pawl 14 engages the secondary locking surface 32 on the ratchet 12. In FIG. 12, the ratchet 12 is shown rotating towards the secondary closed position. When the pawl 14 is in the secondary locking position, the pawl lockout lever 50 remains in the non-lockout position and does not engage the lockout surface 52, and thus still permits movement of the pawl 14 to and from the primary locking position. It will be noted that the pawl 14 itself is preventing the pawl lockout member 50 from leaving the non-lockout position, (by means of a blocking surface 57 on the pawl 14, which obstructs the pawl lockout lever 50 from swinging clockwise in the view shown into position to lock out the pawl 14). However any other suitable member may be used to obstruct the movement of the pawl lockout lever 50.

Figure 13:
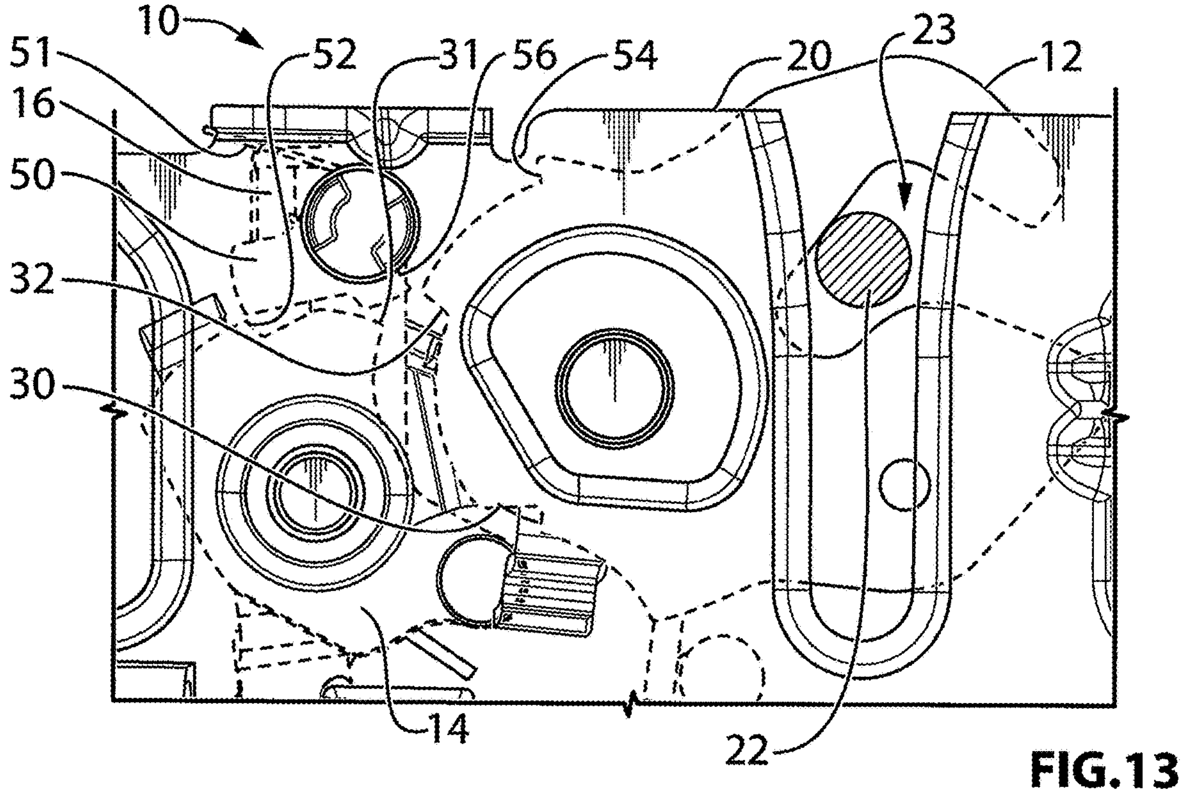
FIG. 13 is a plan view of the latch shown in FIG. 11, showing movement of a pawl towards an unlocked position.
Figure 14:
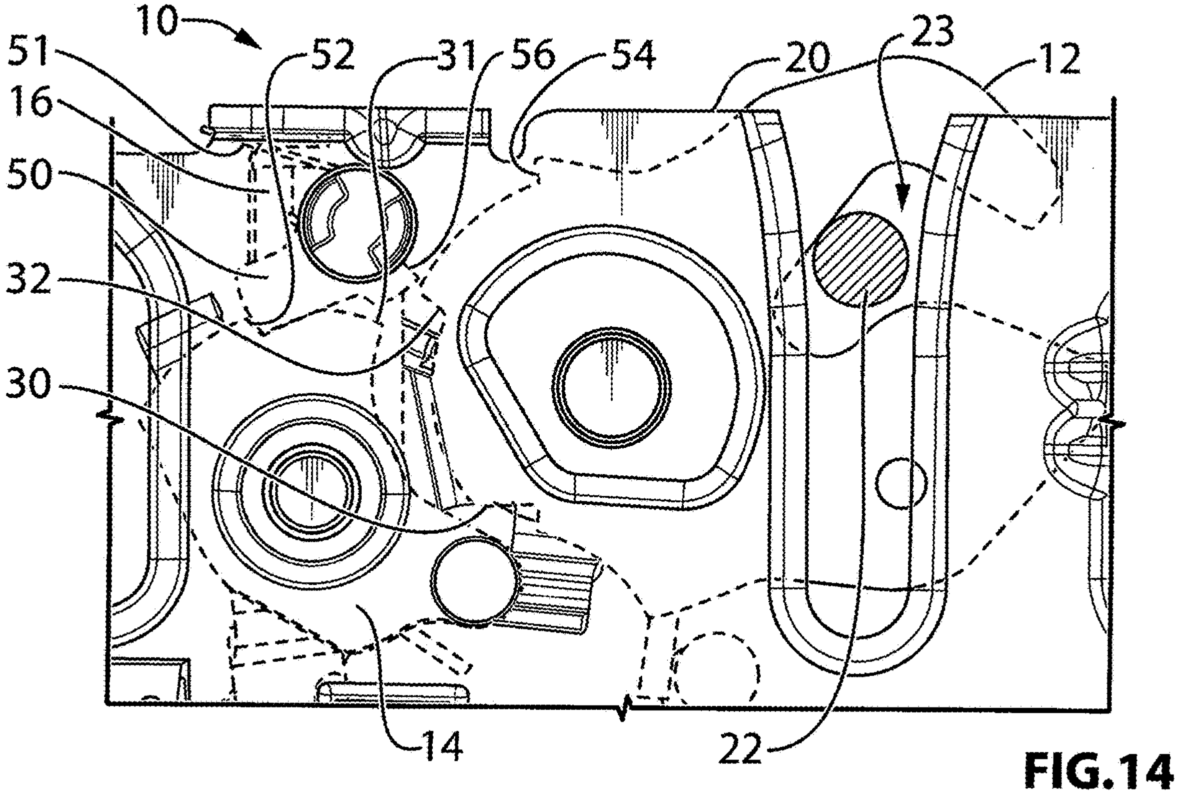
FIG. 14 is a plan view of the latch shown in FIG. 11, showing movement of the pawl lockout member to a lockout position.
Figure 15:
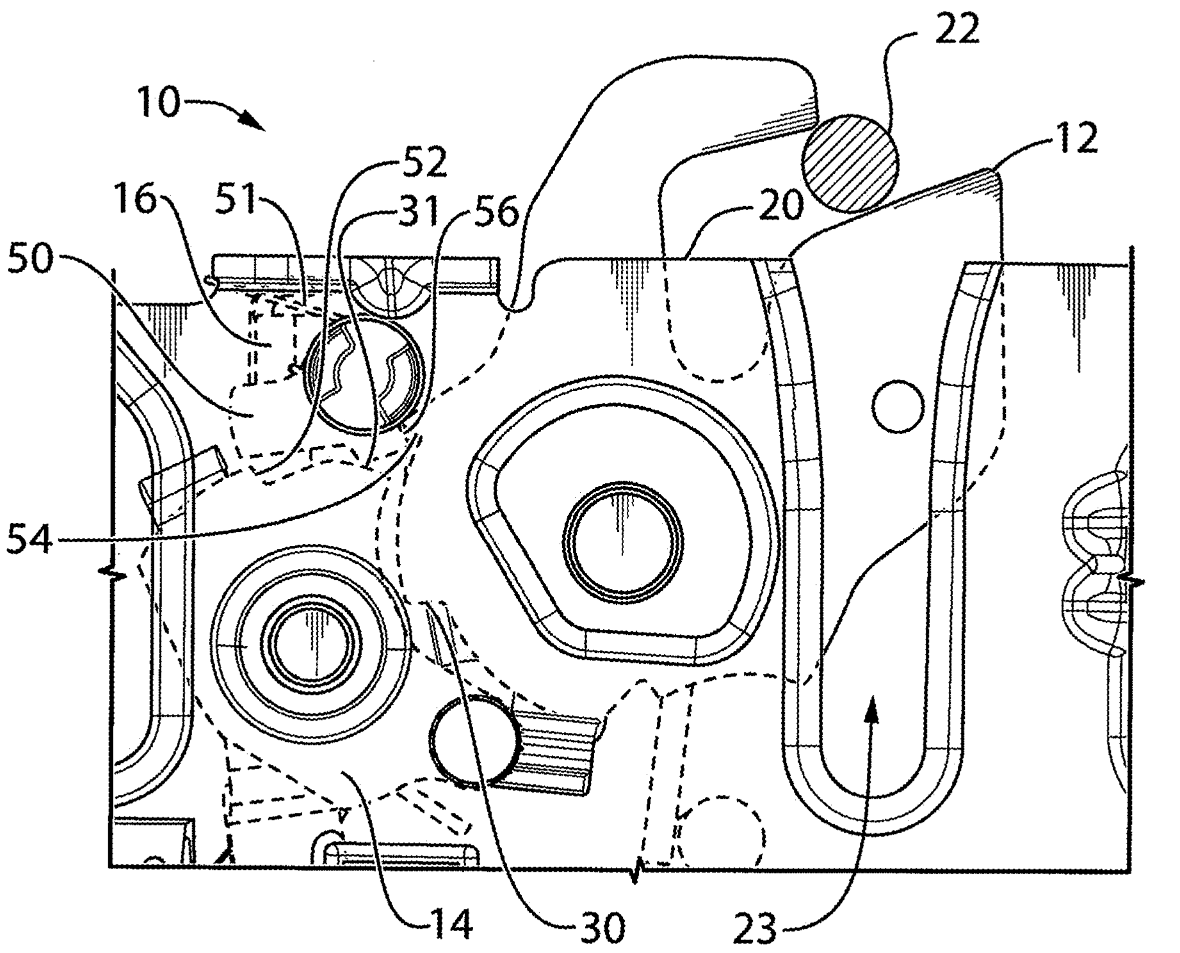
FIG. 15 is a plan view of the latch shown in FIG. 11, showing movement of the ratchet to an open position.
Figure 16:
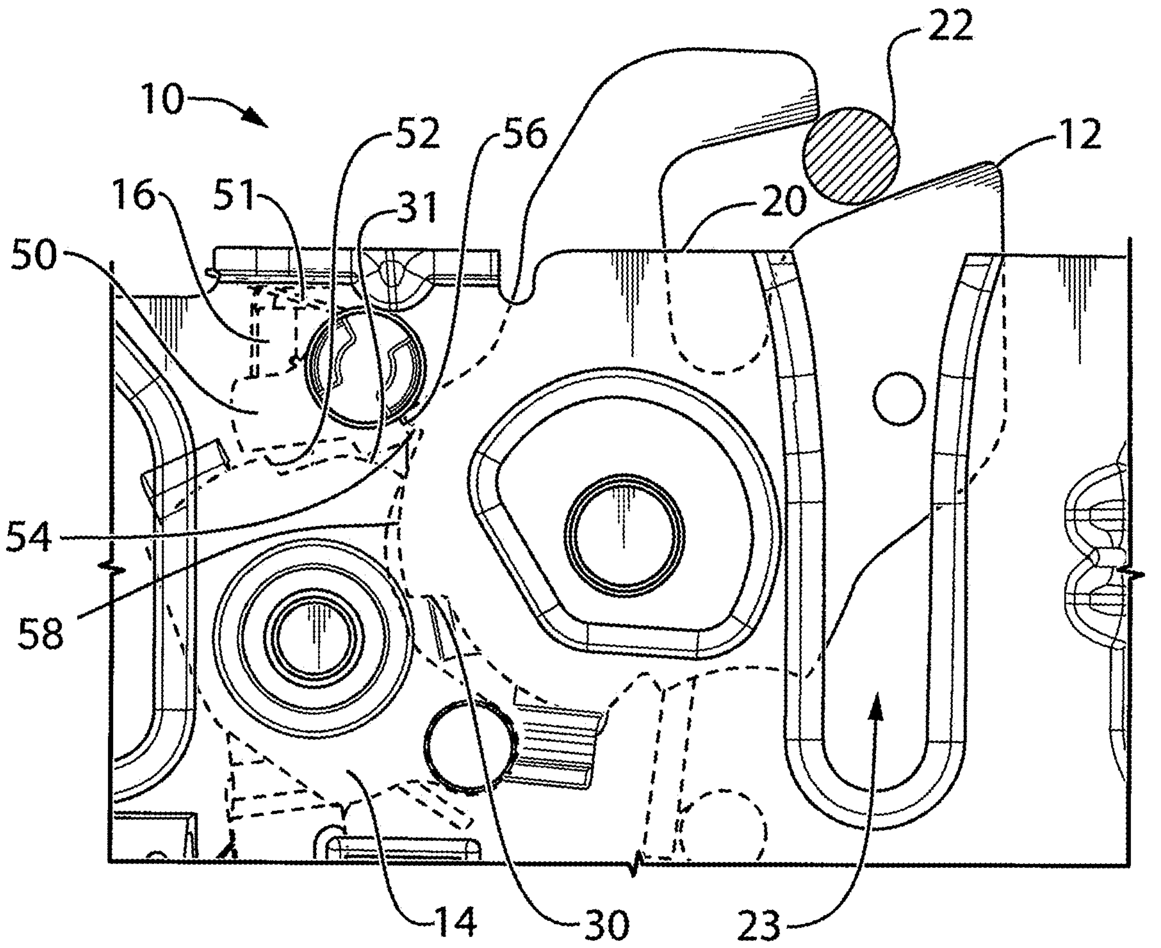
FIG. 16 is a plan view of the latch shown in FIG. 11, showing movement of the pawl to a reset position.

When the handle 35 (FIG. 1) is pulled a second time, the pawl 14 is driven to the unlocking position, shown in FIG. 13. With the pawl 14 in the unlocked position and out of the way, the lockout lever 50 moves into the lockout position (FIG. 14) thereby preventing the pawl 14 from leaving the unlocked position and returning to the secondary locking position when the occupant lets go of the handle 35. As a result, the occupant can exit the vehicle 11 if necessary and manually lift the hood 13. Movement of the ratchet 12 to the open position is shown in FIG. 15. The ratchet 12 has a pawl lockout lever disabling surface 54 thereon that is engageable with a receiving surface 56 on the pawl lockout lever 50. When the ratchet 12 moves towards the open position from the secondary closed position, the pawl lockout lever disabling surface 54 engages and drives the pawl lockout lever 50 (clockwise in the view shown in FIG. 15) so that the pawl lockout lever 50 disengages from the lockout surface 52 on the pawl 14, so as to move the pawl lockout member 50 to the non-lockout position, thereby permitting the pawl 14 to move towards the primary locking position. As shown in FIG. 16, the pawl 14, now freed from the pawl lockout member 50 moves to a reset position wherein the pawl 14 rests against a slide surface 58 on the ratchet 12. Once a striker 22 is reintroduced into fishmouth 23 of the housing 20, the striker 22 drives the ratchet 12 to the primary closed position, which permits the pawl 14 to move to the primary locking position to lock the ratchet 12 in the primary closed position, so as to retain the striker 22 (FIG. 11).

The use of a pawl lockout lever has been shown on a particular configuration of a latch 10, however, the pawl lockout lever may be applied to other configurations of a double pull latch for a hood or for other closure panels in a vehicle where there is a risk of a load from snow, ice or from some other source of weight.

Figure 17:
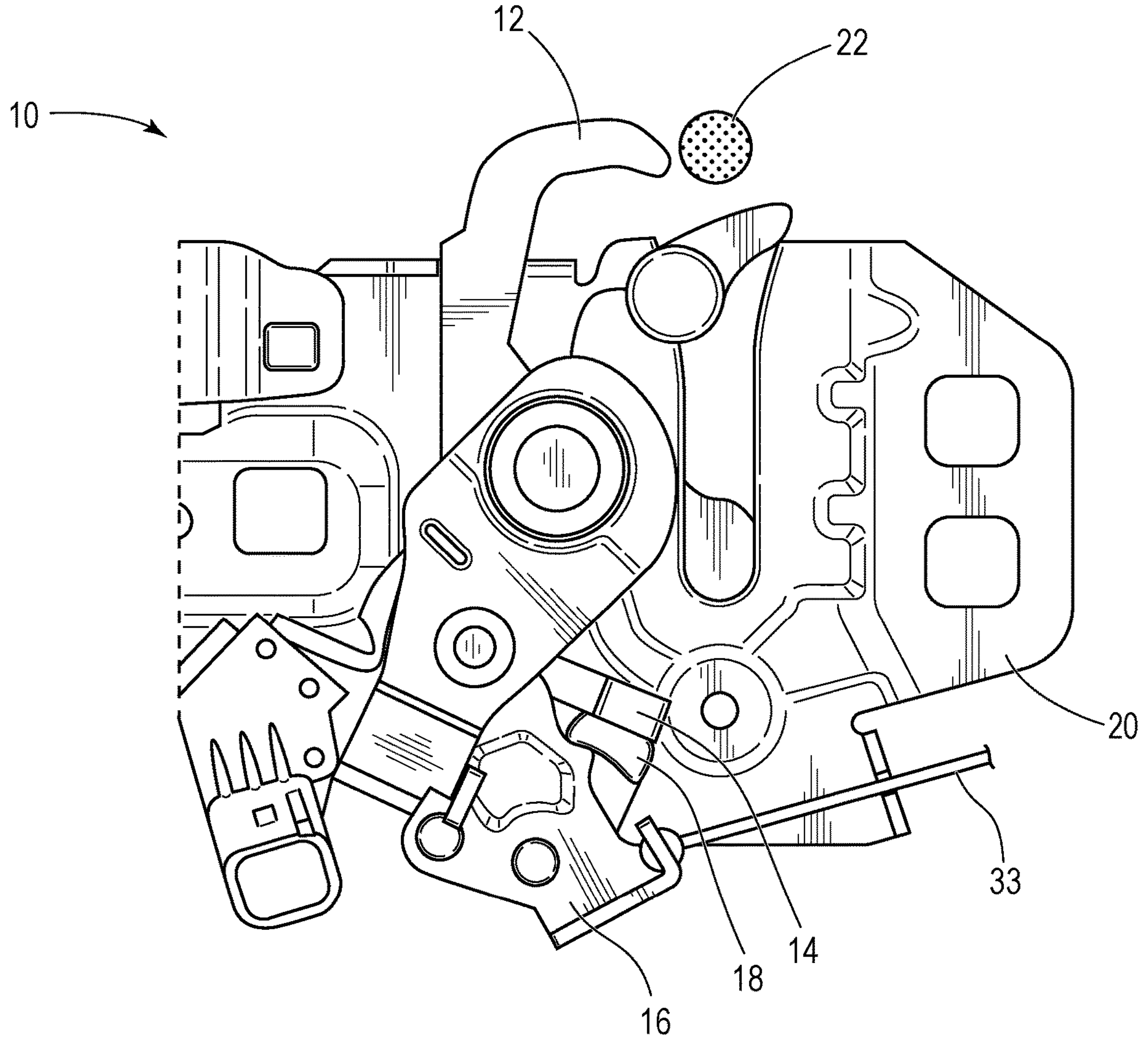
FIG. 17 is a plan view of an alternative configuration for the latch shown in FIG. 1.

As can be seen, in the embodiment shown in FIG. 3, the cable 33 that connects the release lever 16 to the actuation handle 35 (FIG. 1) acts on the release lever 16 at an opposite end of the release lever 16 to an end at which the double pull lever 18 is positioned. Reference is made to FIG. 17, which illustrates an embodiment in which the cable 33 is connected the same end of the release lever 16 that the double pull lever 18 is mounted to. While some components in the embodiment shown in FIG. 17 may have a slightly different shape or configuration as compared to the analogous components in the embodiment shown in FIG. 3, the functions performed may be essentially the same and may be performed in essentially the same way.

While the above description constitutes a plurality of embodiments, it will be appreciated that the present disclosure is susceptible to further modification and change without departing from the fair meaning of the accompanying claims.

We claim:

1. A latch for a closure panel for a vehicle, comprising:

a ratchet movable between a primary closed position, a secondary closed position and an open position, wherein the ratchet is biased towards the open position;

a pawl movable between a primary locking position, a secondary locking position and an unlocking position, the pawl biased towards the primary locking position and having a pawl locking surface for engaging a primary locking surface on the ratchet when the pawl is in the primary closed position for holding the ratchet in the primary closed position and for engaging a secondary locking surface on the ratchet when the pawl is in the secondary locking position for holding the ratchet in the secondary closed position; and a release lever actuatable for moving the pawl;

wherein a first actuation of the release lever moves the pawl directly to the secondary locking position to permit the ratchet to rotate from the primary closed position towards the secondary closed position until the secondary locking surface engages the pawl locking surface, and a second actuation of the release lever moves the pawl to the unlocking position to permit the ratchet to move from the secondary closed position to the open position;

wherein the ratchet rotates continuously from the primary closed position towards the secondary closed position until the second locking surface engages the pawl locking surface.

2. The latch as claimed in claim 1, wherein directly moving the pawl on the first actuation of the release lever results in movement of the pawl to the secondary locking position while inhibiting movement of the pawl past the secondary locking position to the unlocking position.

3. The latch as claimed in claim 2, wherein the first actuation of the release lever causes the release lever to move from a home position to an actuated position, and wherein when the release lever is in the actuated position on the first actuation of the release lever the pawl is in the secondary locking position and the pawl locking surface is engaged with the secondary locking surface, and wherein upon return of the release lever to the home position from the actuated position the pawl locking surface remains in the radial alignment with the secondary locking surface.

4. A latch for a closure panel for a vehicle, comprising:

a ratchet movable between a primary closed position, a secondary closed position and an open position, wherein the ratchet is biased towards the open position;

a pawl movable between a primary locking position, a secondary locking position and an unlocking position, the pawl biased towards the primary locking position and having a pawl locking surface for engaging a primary locking surface on the ratchet when the pawl is in the primary closed position for holding the ratchet in the primary closed position and for engaging a secondary locking surface on the ratchet when the pawl is in the secondary locking position for holding the ratchet in the secondary closed position; and a release lever actuatable for moving the pawl;

wherein a first actuation of the release lever moves the pawl directly to the secondary locking position to permit the ratchet to rotate from the primary closed position towards the secondary closed position until the secondary locking surface engages the pawl locking surface, and a second actuation of the release lever moves the pawl to the unlocking position to permit the ratchet to move from the secondary closed position to the open position, wherein the unlocking position is at a greater radial distance away from the primary locking position than the secondary locking position.

5. The latch as claimed in claim 1, wherein the first actuation of the release lever causes the release lever to move from a home position to an actuated position.

6. The latch as claimed in claim 5, wherein movement of the release lever past the actuated position is prevented so that the release lever cannot move the pawl past the secondary locking position on the first actuation of the release lever.

7. The latch as claimed in claim 6, further comprising a housing having a release lever limit surface, wherein movement of the release lever past the actuated position is prevented by the release lever contacting the release lever limit surface.

8. The latch as claimed in claim 5, wherein a cable connects the release lever to an actuation handle and a pull of the handle moves the release lever from the home position to the actuated position and a release of the handle allows the release lever to return to the home position from the actuated position.

9. The latch as claimed in claim 8, wherein the ratchet is maintained in the secondary locking position by engagement of the pawl locking surface with the secondary locking surface during a return of the release lever from the actuated position to the home position.

10. The latch as claimed in claim 1, wherein when the pawl is moved from the primary locking position to the secondary locking position on the first actuation of the release lever, the ratchet is permitted to rotate directly to the secondary closed position.

11. The latch as claimed in claim 1, wherein the amount of travel of the release lever when moving the pawl from the primary locking position to the secondary locking position is the same as the amount of travel for releasing the pawl from the secondary locking position to the unlocking position.

12. The latch as claimed in claim 11, further comprising an extension member, wherein when the pawl is in the primary locking position the release lever has a selected amount of reach for moving the pawl from the primary locking position to the secondary locking position during movement of the release lever from the home position to the actuated position, and wherein when the pawl is in the secondary locking position the extension member is movable to a position to extend the reach of the release lever to move the pawl from the secondary locking position to the unlocked position during movement of the release lever from the home position to the actuated position.

13. The latch as claimed in claim 1, further comprising a pawl lockout member that is movable between a lockout position and a non-lockout position, wherein in the lockout position the pawl lockout member holds the pawl in the unlocked position, and wherein in the non-lockout position the pawl lockout member permits movement of the pawl to the primary locking position.

14. The latch as claimed in claim 1, further comprising an extension member, wherein when the pawl is in the primary locking position the release lever has a selected amount of reach for driving the pawl from the primary locking position to the secondary locking position during movement of the release lever from the home position to the actuated position, and wherein when the pawl is in the secondary locking position the extension member is movable to a position to extend the reach of the release lever to drive the pawl from the secondary locking position to the unlocked position during movement of the release lever from the home position to the actuated position.

15. The latch as claimed in claim 14, wherein when the pawl is in the primary locking position the extension member is prevented from movement to a position to extend the reach of the release lever to drive the pawl to the unlocked position during movement of the release lever from the home position to the actuated position.

16. The latch as claimed in claim 15, wherein when the pawl is in the primary locking position the extension member is prevented by the pawl from movement to a position to extend the reach of the release lever to drive the pawl to the unlocked position during movement of the release lever from the home position to the actuated position.

17. The latch as claimed in claim 14, wherein the extension member is pivotally mounted to the release lever.

18. The latch as claimed in claim 14, further comprising a housing that includes a release lever limit surface that determines the actuated position for the release lever and prevents movement of the release lever therepast.

19. The latch as claimed in claim 14, further comprising a pawl lockout member that is movable between a lockout position and a non-lockout position, wherein in the lockout position, the pawl lockout member holds the pawl in the unlocked position, and wherein in the non-lockout position the pawl lockout member permits movement of the pawl to the primary locking position.

20. The latch as claimed in claim 5, wherein when the release lever is in the actuated position on the first actuation of the release lever the pawl is in the secondary locking position and the pawl locking surface is aligned with the secondary locking surface.

21. A latch for a closure panel for a vehicle, comprising:

a ratchet movable between a primary closed position, a secondary closed position and an open position, wherein the ratchet is biased towards the open position;

a pawl movable between a primary locking position, a secondary locking position and an unlocking position, the pawl biased towards the primary locking position and having a pawl locking surface for engaging a primary locking surface on the ratchet when the pawl is in the primary closed position for holding the ratchet in the primary closed position and for engaging a secondary locking surface on the ratchet when the pawl is in the secondary locking position for holding the ratchet in the secondary closed position; and a release lever actuatable for moving the pawl;

wherein a first actuation of the release lever moves the pawl directly to the secondary locking position to permit the ratchet to rotate from the primary closed position towards the secondary closed position until the secondary locking surface engages the pawl locking surface, and a second actuation of the release lever moves the pawl to the unlocking position to permit the ratchet to move from the secondary closed position to the open position;

wherein the first actuation of the release lever causes the pawl to rotate in a single direction from the primary locking position to the secondary locking position.

22. A latch for a closure panel for a vehicle, comprising:

a ratchet movable between a primary closed position, a secondary closed position and an open position, wherein the ratchet is biased towards the open position;

a pawl movable between a primary locking position, a secondary locking position and an unlocking position, the pawl biased towards the primary locking position and having a pawl locking surface for engaging a primary locking surface on the ratchet when the pawl is in the primary closed position for holding the ratchet in the primary closed position and for engaging a secondary locking surface on the ratchet when the pawl is in the secondary locking position for holding the ratchet in the secondary closed position; and a release lever actuatable for moving the pawl;

wherein a first actuation of the release lever moves the pawl directly to the secondary locking position to permit the ratchet to rotate from the primary closed position towards the secondary closed position until the secondary locking surface engages the pawl locking surface, and a second actuation of the release lever moves the pawl to the unlocking position to permit the ratchet to move from the secondary closed position to the open position;

wherein the secondary locking surface extends further away from a ratchet axis than the primary locking surface and wherein the first actuation of the release lever moves the pawl to the secondary locking position so that the pawl locking surface is positioned in a radial alignment with the secondary locking surface and cannot move the pawl locking surface past the radial alignment with the secondary locking surface to permit the ratchet to rotate until the secondary locking surface engages the pawl locking surface, and a second actuation of the release lever moves the pawl to the unlocking position so that the pawl locking surface is positioned as past the radial alignment with the secondary locking surface to permit the ratchet to move from the secondary closed position to the open position.

* * * * *